US009768936B2

(12) United States Patent
Levy

(10) Patent No.: US 9,768,936 B2
(45) Date of Patent: Sep. 19, 2017

(54) MESSAGE TRANSMISSION IN AN UNLICENSED SPECTRUM

(71) Applicant: Avago Technologies General IP (Singapore) Pte. Ltd., Singapore (SG)

(72) Inventor: Sharon Levy, Binyamina (IL)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/882,126

(22) Filed: Oct. 13, 2015

(65) Prior Publication Data

US 2016/0127104 A1 May 5, 2016

Related U.S. Application Data

(60) Provisional application No. 62/074,337, filed on Nov. 3, 2014.

(51) Int. Cl.
*H04W 4/00* (2009.01)
*H04L 5/00* (2006.01)
*H04L 27/00* (2006.01)

(52) U.S. Cl.
CPC ........ *H04L 5/0055* (2013.01); *H04L 27/0006* (2013.01)

(58) Field of Classification Search
CPC ............................ H04L 5/0055; H04L 27/0006
USPC ........................................ 455/422.1; 370/338
See application file for complete search history.

(56) References Cited

U.S. PATENT DOCUMENTS

| 2005/0249163 A1* | 11/2005 | Kim ....... H04L 1/1845 370/335 |
| 2013/0194933 A1* | 8/2013 | Celik ...... H04L 1/1685 370/242 |
| 2015/0181638 A1* | 6/2015 | Tabet ...... H04W 76/025 370/228 |

OTHER PUBLICATIONS

Broadcom Corporation, Cablelabs, Deployment and Evaluation Considerations for LAA-LTE (R1-144234), Written Contribution at 3GPP Meeting, Ljubljana, Slovenia, Oct. 6-10, 2014, 2 pages.

(Continued)

*Primary Examiner* — Marcos Batista
(74) *Attorney, Agent, or Firm* — Foley & Lardner LLP

(57) ABSTRACT

A method includes transmitting, at an access point configured to transmit data over an unlicensed band, a message to user equipment. The user equipment transmits to the access point an acknowledgement message indicating whether data provided within the message was successfully received in response to the message. The method further includes determining, at the access point, whether a buffer associated with the user equipment is empty. The method further includes retransmitting, from the access point to the user equipment, the message in response to determining the buffer of the user equipment is empty.

20 Claims, 4 Drawing Sheets

(56) References Cited

OTHER PUBLICATIONS

Broadcom Corporation, Cablelabs, PHY enhancement areas & options to support robust coexistence LAA (R1-144233), Written Contribution at 3GPP Meeting, Ljubljana, Slovenia, Oct. 6-10, 2014, 3 pages.
Broadcom Corporation, Cablelabs, Robust-Coexistence Considerations for LAA-LTE (R1-144232), Written Contribution at 3GPP Meeting, Ljubljana, Slovenia, Oct. 6-10, 2014, 2 pages.
Ericsson et al., Study on Licensed-Assisted Access using LTE (RP-141664), Written Contribution at 3GPP Meeting, Edinburgh, Scotland, Sep. 9-12, 2014, 8 pages.
WI-FI Alliance, Wi-Fi Certified Voice-Enterprise: Delivering Wi-Fi voice to the enterprise, dated May 2012, 11 pages.

* cited by examiner

MESSAGE TRANSMISSION IN AN UNLICENSED SPECTRUM

CROSS-REFERENCE TO RELATED APPLICATIONS

The present application claims priority to U.S. Provisional Patent Application No. 62/074,337, filed Nov. 3, 2014, which is incorporated herein by reference in its entirety.

FIELD

The present disclosure relates generally to the field of networking, including, but not limited to, the use of Long-Term Evolution (LTE) in a cell or access point.

BACKGROUND

Communications systems such as WiFi (802.11) and LAA-LTE (Licensed Assisted Access-LTE, also called LTE-U or unlicensed LTE) generally makes use of an unlicensed spectrum (i.e., a spectrum not reserved for a particular company, network, etc.). It is difficult to operate in the unlicensed spectrum, as interference in the unlicensed band occurs between various devices attempting to communicate.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
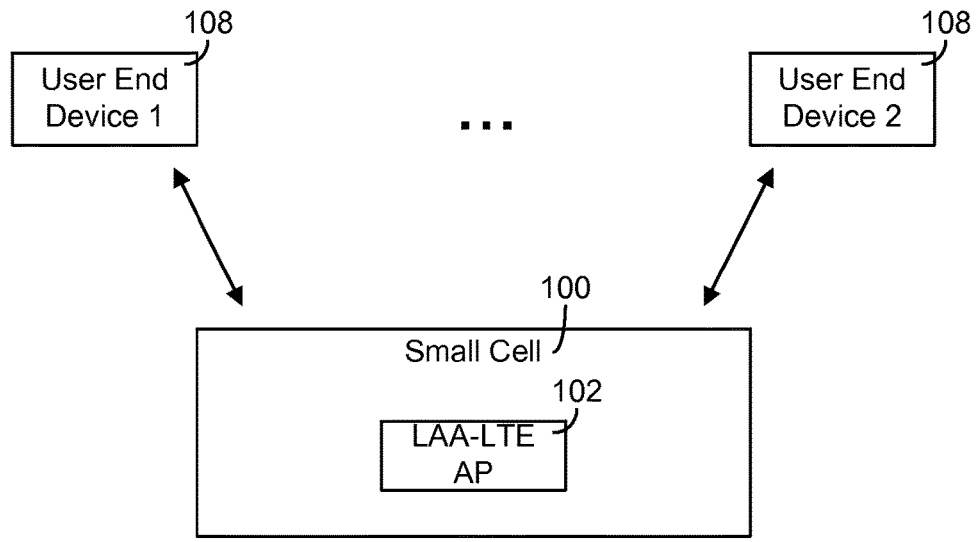
FIG. 1 is a block diagram of an environment including a cell with LAA-LTE capability and a plurality of devices in communication with the cell according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, various systems and methods for managing LTE communications between a plurality of LTE devices (e.g., one or more cells and a one or more other devices, such as other cells and/or user devices or user equipment) communicating LTE signals with one another are shown and described. The communications occur over an unlicensed band or spectrum (e.g., a band not reserved for a particular company, network, etc.).

In some embodiments, a cell or access point (e.g., a LAA-LTE access point) transmits a message, such as a hybrid automatic repeat request (Hybrid ARQ, or HARQ), to one or more other devices, such as user equipment (UE). In response, the UE transmits an acknowledgement message indicating whether the first message was successfully received by the UE. The access point determines whether a buffer associated with the UE is empty. In response to determining the buffer is empty, the access point retransmits the message. In some embodiments, the access point retransmits the message prior to receiving the acknowledgement message. In some embodiments, the access point retransmits the message to another access point which transmits the message over a licensed band, for example, if a priority level of the message is above a particular threshold level.

LAA-LTE (or LTE-U) is a standard for wireless communication that makes use of the unlicensed spectrum. In various exemplary embodiments of the present disclosure, the cell is, or includes, a LAA-LTE access point that facilitates use of the unlicensed spectrum (e.g., to avoid interference).

The present disclosure describes a cell design integrating a LAA-LTE access point. In other embodiments, the cell design includes a LAA-LTE access point and one or more WiFi access points integrated within or coupled to the cell to help facilitate use of the unlicensed spectrum (e.g., to help avoid interference with WiFi and/or other devices also utilizing the unlicensed spectrum).

In the present disclosure, the terms "user equipment" and "user end device" are used interchangeably, and "UE" is used as an abbreviation of the terms. Further, the terms "LAA-LTE AP", "LTE access point", "small cell", "LAA cell" and other like terms are used interchangeably.

The present disclosure describes cells with LAA-LTE capability; in various embodiments, the systems and methods herein are implemented on one or more of any types of devices (e.g., user equipment, such as phones, handsets and/or handheld computers, laptops tablets, etc. and/or access points, such as devices similar to LTE eNodeB (eNB) devices) with capability for LAA-LTE communications in the unlicensed spectrum.

Figure 2:
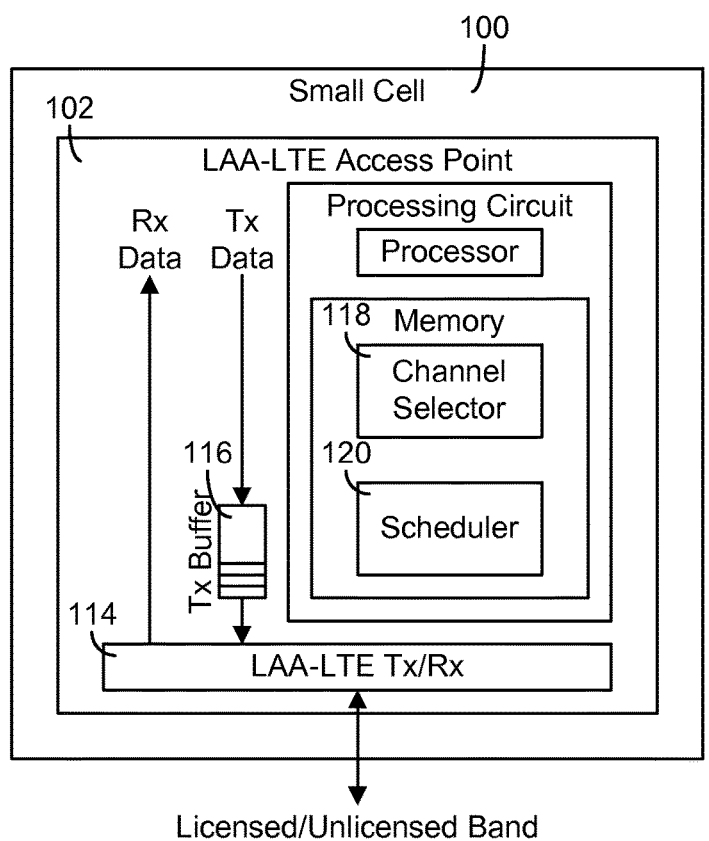
FIG. 2 is a more detailed block diagram of the cell design of FIG. 1 according to an exemplary embodiment.

Referring to FIGS. 1-2, block diagrams of a cell 100 (e.g., LAA-LTE cell) design are shown, according to exemplary embodiments. As shown in FIG. 1, cell 100 includes a LAA-LTE access point (AP) 102. In some embodiments, cell 100 includes only LAA-LTE AP 102, and in other embodiments, cell 100 includes one or more other components and/or devices (e.g., cell 100 includes multiple LAA-LTE APs, includes one or more WiFi APs, etc.). In some embodiments, cell 100 includes a plurality of LAA-LTE APs. In some embodiments, cell 100 includes a LAA-LTE AP and a plurality of WiFi APs. It should be understood that the systems and methods described herein can be implemented for any embodiment of cell 100 that includes any combination of LAA-LTE APs and WiFi APs. In particular, while the term "LAA-LTE AP" is used to describe an access point in the present disclosure, it should be understood that a WiFi AP can provide the same or similar functionality as described herein with reference to LAA-LTE APs.

Referring further to FIG. 1, cell 100 is shown in communication with a number of devices 108 (e.g., user equipment or user end devices, other cells including access points, and/or other devices). Cell 100 is implementable in an environment such as an office, commercial or residential building, school, or any other type of environment in which devices connect wirelessly. Cell 100 communicates with the various devices 108 over a network that incorporates one or more of a variety of communication methods or protocols. For example, some devices 108 communicate with cell 100 via LAA-LTE. In some embodiments, some devices 108 communicate with cell 100 via WiFi (e.g., 802.11n, 80211.ac, etc.).

Referring more specifically to FIG. 2, an example embodiment of cell 100 is shown. Cell 100 includes a LAA-LTE AP 102; again, in other embodiments, cell 100 includes multiple access points and/or include one or both of LAA-LTE APs and WiFi APs. LAA-LTE AP 102 is shown to generally include a transmitter/receiver circuit 114 for transmitting and receiving data, and a buffer 116 for data to be transmitted. In some embodiments, LAA-LTE AP 102 further includes a UART-based general circuit interface (GCI), and a peripheral component interconnect express (PCIe) interface for communication with other modules within cell 100.

LAA-LTE AP 102 is further shown to include a processing circuit including a processor and memory. The memory is shown to include channel selector 118 and scheduler 120. In some embodiments, the memory further includes other modules for controlling the activities of LAA-LTE AP 102. In some embodiments, the processor is, or includes, one or more microprocessors, application specific integrated circuits (ASICs), circuits containing one or more processing components, a group of distributed processing components, circuitry for supporting a microprocessor, or other hardware for processing. The processor executes computer code stored in memory to complete and facilitate the activities described herein. The memory is any volatile or non-volatile computer-readable storage medium capable of storing data or computer code relating to the activities described herein. For example, the memory is shown to include modules which are computer code modules (e.g., executable code, object code, source code, script code, machine code, etc.) for execution by the processor. According to some embodiments, the processing circuits represent a collection of processing devices (e.g., servers, data centers, etc.). In such cases, the processor represents the collective processors of the devices and the memory represents the collective storage devices of the devices. The processing circuit completes the activities described herein by executing software instructions stored in the memories in some embodiments. In some embodiments, channel selector 118 and/or scheduler 120 are implemented outside of the memory (e.g., using hardware-based circuitry).

Channel selector 118 selects a channel for communications for cell 100. When multiple devices (e.g., LAA-LTE devices, or an LAA-LTE device and one or more WiFi APs/devices), operate on the same unlicensed band, the devices can cause co-channel interference and data collision when attempting to communicate at the same time. In some embodiments, channel selector 118 scans for neighboring LAA-LTE APs and WiFi APs that could cause interference. Channel selector 118 determines the current channel allocation for the RF environment, in some embodiments. Scheduler 120 schedules transmissions by LAA-LTE AP 102.

Figure 3:
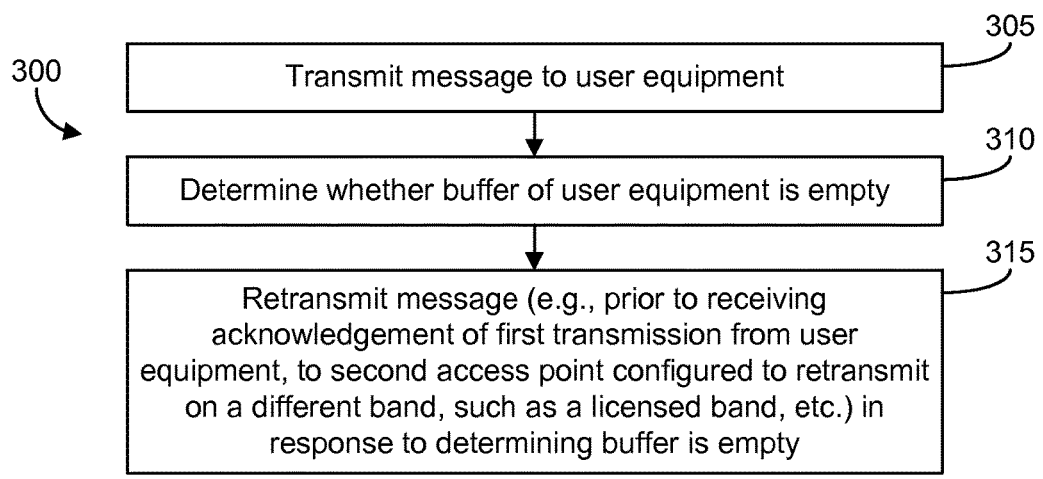
FIG. 3 is a flow chart of a process for transmitting messages in an unlicensed spectrum according to an exemplary embodiment.

Referring now to FIG. 3, a flow chart of a flow 300 for transmitting messages in an unlicensed spectrum is shown. In some embodiments, a UE is connected to multiple cells, one or more of which is a licensed carrier, and one or more of which is an unlicensed carrier (e.g., a cell that can transmit at least a portion of data on an unlicensed band). In some cases, data transmitted over the unlicensed carrier should be retransmitted, but the unlicensed channel is not available for transmission. One example of such a case is when a channel reservation is made over a long period of time (e.g., 100 milliseconds) and one of the last blocks of data transmitted in the period of time fails (e.g., does not receive a response, or receives a non-acknowledge (NACK) message indicating part or all of the message transmission failed). The data should be retransmitted; however, the channel reservation has expired.

In some embodiments, transmission of a block of data on the unlicensed band (e.g., a later or last block in a set of data blocks) fails and is retransmitted. In some embodiments, the buffers of the cell are empty, and the cell transmits several empty timeframes (e.g., empty Transmission Time Intervals (TTIs)) over the unlicensed band. In some embodiments, the empty TTIs are transmitted at low power, and WiFi APs sharing the channel with the cell could transmit in the same TTI and cause data collisions.

In some embodiments, the activities of flow 300 provide retransmissions of previous transmitted messages over an unlicensed and/or licensed band. An access point or cell (e.g., LAA-LTE cell) transmits a first message to a UE (operation 305). In some embodiments, the first message includes multiple blocks, or portions, of data. The UE, in response to the first message, transmits an acknowledgement message. The acknowledgement message indicates whether the data provided within the message was successfully received by the UE. In some embodiments, the acknowledgement message includes a first indication (e.g., ACK) indicating the data was successfully received and a second indication (e.g., NACK) indicating that some or all of the data was not successfully received. In some embodiments, the cell that transmitted the first message retransmits the message in response to receiving a NACK response.

The cell determines whether a buffer associated with the UE becomes empty (operation 310). When the buffer becomes empty, in some embodiments, the cell transmits empty TTIs until data enters the buffer. The empty TTIs represent wasted resources, and allow for possible interference on the unlicensed channel, as discussed above.

In some embodiments, the cell retransmits the message to the UE in response to determining the buffer is empty (operation 315). In some embodiments, the cell retransmits the message prior to receiving the acknowledgement message from the UE. Retransmitting the message upon determining the buffer is empty utilizes TTIs that would otherwise be wasted, in some embodiments, and provides greater efficiency by avoiding retransmitting the message at a later time, when the buffer is not empty. In some embodiments, in response to determining the buffer is not empty, the cell waits to retransmit the message until receiving the acknowledgement message (e.g., ACK or NACK) and determining whether the message should be retransmitted based on the acknowledgement message.

In some embodiments, if the delay before receiving the acknowledgement message is larger than the delay before data retransmission, the transmission error rate after a certain timeframe is reduced. For example, in such embodiments, the rate of successful reception of data by a UE within a certain number of TTIs is increased, as compared to waiting for a NACK before starting retransmission. In such embodiments, the initial transmission error rate is targeted to be 10%, and the error following the first retransmission could be designed to reach an error rate much smaller than 1%.

In some embodiments, the timing is set dynamically. For example, the delay is set according to the transmitted block length for considering the expected decoding delay for the UE. For example, if block processing standards are relatively high (e.g., due to high payload, 4 layers spatial multiplexing, etc.), the delay prior to retransmission will be higher than the delay for low processing blocks, in some embodiments.

In some embodiments, the cell determines how to retransmit a message based on a priority level associated with the message and/or the data embedded in the message. For example, a message is assigned one of a plurality of priority levels (e.g., high, medium, low, etc.). If the priority level is above a threshold level (e.g., if the priority level is high), the cell transmits the message to another cell, such as a cell which transmits over a licensed band. In some embodiments, if the priority level is below the threshold value, the message is retransmitted over the unlicensed band, or the cell waits to retransmit the message until receiving the acknowledgement message.

In some embodiments, a message transmitted from the cell to the UE (e.g., a radio resource control (RRC) message) is used to provide information to the UE about the retransmission source cell (i.e., carrier and HARQ process indexes). For example, in some embodiments, an additional bitmap is added to Downlink Control Information (DCI) formats related to the downlink (e.g., 1a, 2, 2a, etc.) that indicate the original cell used for this data transmission.

In some embodiments, different channels (e.g., licensed and unlicensed channels) are used for incremental encoding (e.g., for video). For example, in some embodiments, a basic quality signal is transmitted over a primary cell on a licensed channel, and refinement data (e.g., data used to improve the quality of the encoded video) is transmitted by a secondary cell over an unlicensed channel.

Figure 4:
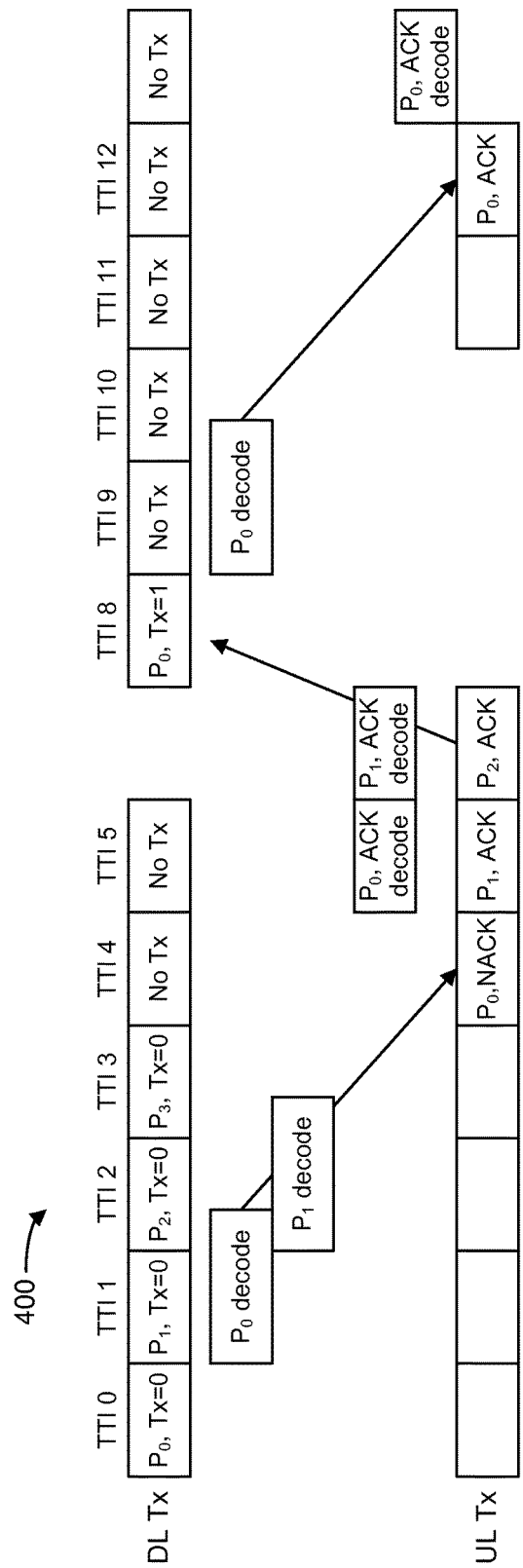
FIG. 4 is a timing diagram of a signal flow relating to a hybrid automatic repeat request (Hybrid ARQ, or HARQ) in a LTE system according to an exemplary embodiment.
Figure 5:
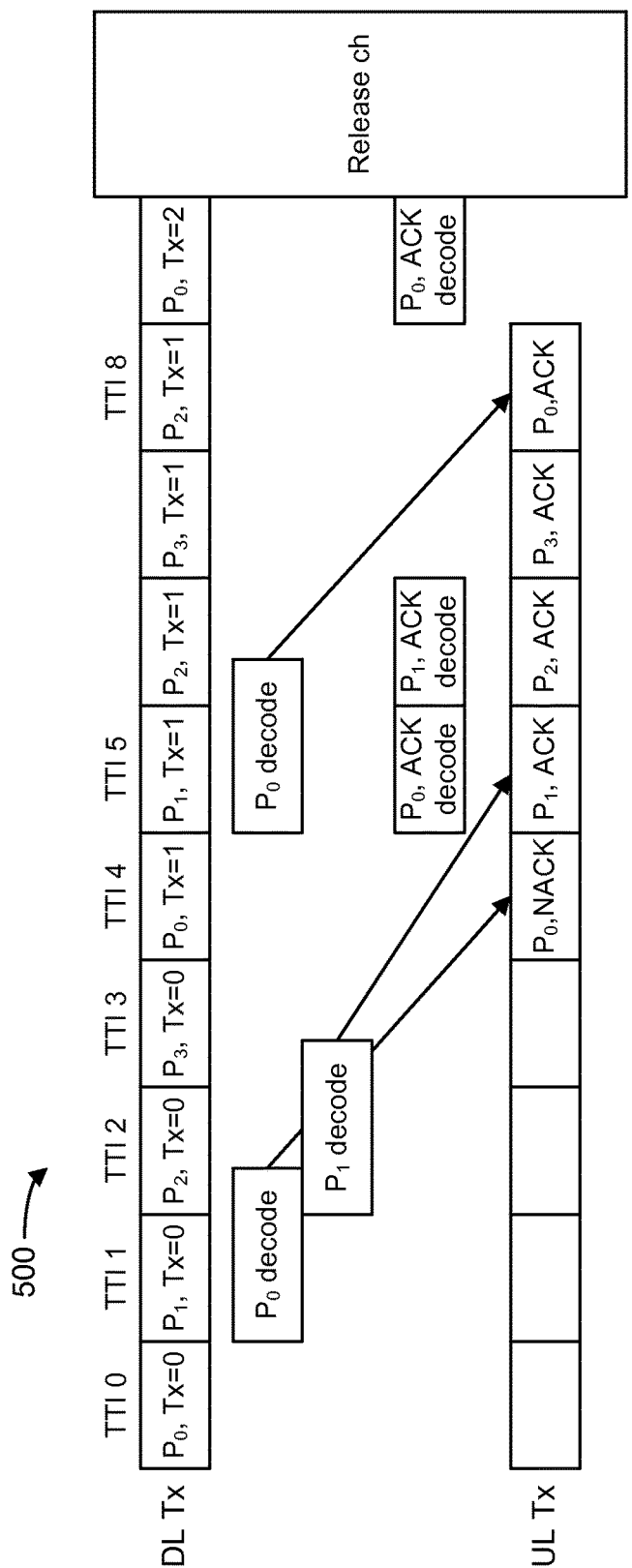
FIG. 5 is a timing diagram of a signal flow for retransmitting a signal prior to receiving an acknowledgement message according to an exemplary embodiment.

Referring now to FIGS. 4 and 5, timing diagrams illustrating a flow of signals between a cell (e.g., a LTE eNB device) and a UE are shown according to exemplary embodiments. While FIGS. 4-5 describe a eNB device, it should be understood that in other embodiments the device is any type of LAA-LTE capable device or access point as described above. FIG. 4 illustrates a timing diagram 400 for a HARQ process in LTE. The illustrative embodiment shown in FIG. 4 illustrates timing for Frequency Division Duplex (FDD), in which two different radio frequencies for transmitting and receiving are used in communication. It should be understood that similar concepts to those shown in FIG. 4 could be applied to a Time Division Duplex (TDD) setup between devices in other embodiments. In this embodiment, a single UE is attached to the eNB device. In some embodiments, if multiple UEs are attached to the cell, then the eNB device could schedule several UEs in each TTI and use time domain scheduling to fill the entire allocation.

As shown in timing diagram 400, the eNB device transmits the entire data buffer for the UE over 4 TTIs (TTI 0-3). Following the decoding at the UE, the UE transmits an acknowledgement message (e.g., ACK/NACK) with a 4 TTI delay (for the FDD scheme; different delays would apply for a TDD scheme). In some embodiments, the transmission is on a same carrier (e.g., R-8/9) or over a different carrier (e.g., carrier aggregation R-10/11/12, LAA).

The eNB device decodes the ACK/NACK message and sends a retransmission over TTI 8 for process $P_0$. Process $P_1$ is not retransmitted. The eNB device then receives the ACK for the retransmission, so the eNB device does not continue retransmission to the UE. The eNB buffers are empty (e.g., indicating no more data for this UE, and no other UEs in the system); therefore the eNB device will transmit only common channels and pilots over all the TTIs, in some embodiments (except for TTI 8, which is used for the retransmission).

For the eNB device, it is not clear if or when the channel will be available. Further, lower power periods could be used by WiFi APs. In this scenario, in some embodiments, the eNB device could follow one of the following options: (1) reserve the channel (e.g., using a clear to send (CTS) message, such as a CTS-to-nowhere message with an address not corresponding to other devices in the network, for broadcasting to the other devices an intent to transmit on a channel) until the retransmission window is finished, which wastes channel bandwidth, and is uncertain because it is not clear if reservation is possible, or (2) continue to try reserving the channels for TTIs (TTI 8 in the example of FIG. 4), which will cost power (e.g., battery), and increase the packet delay. In some embodiments, based on channel settings, the same channel should be used for retransmission that was used for the original transmission. Under the first option above, the retransmission would likely occur over the primary (e.g., licensed) channel.

In some embodiments, the retransmission is compressed, and the data is retransmitted before an ACK/NACK is received. In some such embodiments, the data is retransmitted to allow enough time for the UE to perform decoding. FIG. 5 illustrates a timing diagram 500 in which the $P_o$ signal is retransmitted before the ACK/NACK of the original transmission is received. As can be seen in timing diagram 500, the original $P_0$ NACK is decoded at the UE within the same TTI in which the $P_0$ retransmission occurs at the eNB (thus ensuring that the UE had finished decoding the original block). In some embodiments, in the case the UE receives a retransmission for a block that previously passed (e.g., for which a prior ACK was transmitted by the UE), the UE sends another ACK signal without decoding the block again.

In some embodiments, the eNB device additionally, or alternatively, stops after a threshold number of retransmissions (e.g., several retransmissions) and assume that the block has passed. For example, after three retransmissions, the probability is high that the block passed in one of the transmissions (e.g., approaching a probability of false ACK detection), and the eNB stops retransmitting the data.

Embodiments of the disclosure are described in the general context of method steps which are implemented in some embodiments by a program product including machine-executable instructions, such as program code, for example, in the form of program modules executed by machines in networked environments.

It should be noted that although the flowcharts provided herein show a specific order of method steps, it is understood that the order of these steps can differ from what is depicted. Also two or more steps can be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or can be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
   transmitting, at an access point configured to transmit data over an unlicensed band, a message to user equipment, the user equipment configured to transmit, to the access point, an acknowledgement message indicating whether data provided within the message was successfully received in response to the message;
   determining, at the access point, whether a buffer associated with the user equipment is empty; and
   retransmitting, from the access point to the user equipment, the message in response to determining the buffer of the user equipment is empty.

2. The method of claim 1, the operation of retransmitting the message comprising retransmitting the message prior to receiving the acknowledgement message from the user equipment.

3. The method of claim 1, further comprising waiting to retransmit the message until the acknowledgement message is received in response to determining the buffer of the user equipment is not empty.

4. The method of claim 1, wherein the access point comprises a first access point, the method further comprising:
   determining a priority associated with the data provided within the message; and
   sending the message to a second access point for retransmission to the user equipment in response to the priority exceeding a threshold priority.

5. The method of claim 4, wherein the second access point is configured to retransmit the message over a licensed band.

6. The method of claim 1, wherein the access point comprises one of a Long Term Evolution (LTE) access point, a WiFi access point, or a hybrid access point including both LTE and WiFi components.

7. The method of claim 1, further comprising discontinuing retransmission of the message after a threshold number of retransmissions.

8. A method comprising:
   transmitting, at a first access point configured to transmit data over an unlicensed band, a message to user equipment over the unlicensed band, the user equipment configured to transmit, to the first access point, an acknowledgement message indicating whether data provided within the message was successfully received in response to the message;
   determining, by the first access point, a priority associated with the data provided within the message;
   sending the message to a second access point for retransmission to the user equipment in response to the priority exceeding a threshold priority; and
   in response to determining the priority to be less than or equal to the threshold priority:
      determining, at the first access point, whether a buffer associated with the user equipment is empty; and
      retransmitting, from the first access point to the user equipment, the message in response to determining the buffer of the user equipment is empty.

9. The method of claim 8, wherein the second access point is configured to retransmit the message over a licensed band.

10. The method of claim 8, further comprising providing a bitmap within a retransmitted message from the second access point to the user equipment identifying the first access point as an original source of the message.

11. The method of claim 8, the data transmitted over the unlicensed band comprising refinement data configured to improve a quality of second data transmitted over a licensed band.

12. The method of claim 11, the at least one of the data or the second data comprising video data.

13. A system comprising:
   an access point configured to transmit data over an unlicensed band and comprising circuitry configured to:
      transmit a message to user equipment, the user equipment configured to transmit, to the access point, an acknowledgement message indicating whether data provided within the message was successfully received in response to the message;
      determine whether a buffer associated with the user equipment is empty; and
      retransmit, to the user equipment, the message in response to determining the buffer of the user equipment is empty.

14. The system of claim 13, the circuitry configured to retransmit the message prior to receiving the acknowledgement message from the user equipment.

15. The system of claim 13, the circuitry configured to wait to retransmit the message until the acknowledgement message is received in response to determining the buffer of the user equipment is not empty.

16. The system of claim 13, wherein the access point comprises a first access point, the circuitry further configured to:
   determine a priority associated with the data provided within the message; and
   send the message to a second access point for retransmission to the user equipment in response to the priority exceeding a threshold priority.

17. The system of claim 16, wherein the second access point is configured to retransmit the message over a licensed band.

18. The system of claim 13, wherein the access point comprises one of a Long Term Evolution (LTE) access point, a WiFi access point, or a hybrid access point including both LTE and WiFi components.

19. The system of claim 13, the circuitry configured to discontinue retransmission of the message after a threshold number of retransmissions.

20. The method of claim 8, the operation of retransmitting the message comprising retransmitting the message prior to receiving the acknowledgement message from the user equipment.

* * * * *